United States Patent [19]
Penza

[11] Patent Number: 5,899,795
[45] Date of Patent: May 4, 1999

[54] MULTI-FUNCTION PIPELINE WELD REMOVAL APPARATUS

[76] Inventor: G. Gregory Penza, 42 Valentine Ave., Huntington, N.Y. 11743

[21] Appl. No.: 08/769,818

[22] Filed: Dec. 19, 1996

[51] Int. Cl.⁶ ........................................................ B24B 1/00
[52] U.S. Cl. .............................. 451/61; 451/51; 451/180; 451/440; 451/462; 451/465; 15/104.09; 408/79; 408/103
[58] Field of Search .................................. 451/51, 54, 59, 451/61, 180, 440, 462, 464, 465, 481, 484, 485; 15/104.09, 104.13, 104.14; 408/77, 79, 80, 81, 82, 83, 104, 113, 114

[56] References Cited

U.S. PATENT DOCUMENTS

| | | |
|---|---|---|
| 2,320,747 | 6/1943 | Peterson et al. . |
| 4,084,484 | 4/1978 | Shklyanov et al. . |
| 4,460,920 | 7/1984 | Weber et al. . |
| 4,601,133 | 7/1986 | Gebald et al. . |
| 4,862,648 | 9/1989 | Savolainen . |
| 4,887,585 | 12/1989 | Nutt . |
| 5,054,976 | 10/1991 | Akesaka et al. . |
| 5,062,187 | 11/1991 | Bromley . |
| 5,175,964 | 1/1993 | Girndt . |
| 5,207,031 | 5/1993 | Gammelgaard . |
| 5,233,791 | 8/1993 | McQueen, Jr. . |

*Primary Examiner*—Eileen P. Morgan
*Attorney, Agent, or Firm*—Brooks & Kushman P.C.

[57] ABSTRACT

A pipeline and tubular structure renovation apparatus facilitates rapid and economical removal of protrusions into the interior of pipelines and other tubular structures, particularly gas pipelines having excess weld or devices such as nipples, etc. The apparatus consists of a generally cylindrical carriage mounted on wheels or skids which substantially center the apparatus within a pipeline; a clamping device to clamp the carriage in position; and a centrifugal tool head which may perform grinding, cleaning, polishing and other operations. Grinding may be accomplished in both radial and plunge cutting modes. The apparatus is robust and of simple and economical construction Weld removal speed is considerably faster than that achieved by conventional precision grinding tools.

14 Claims, 9 Drawing Sheets

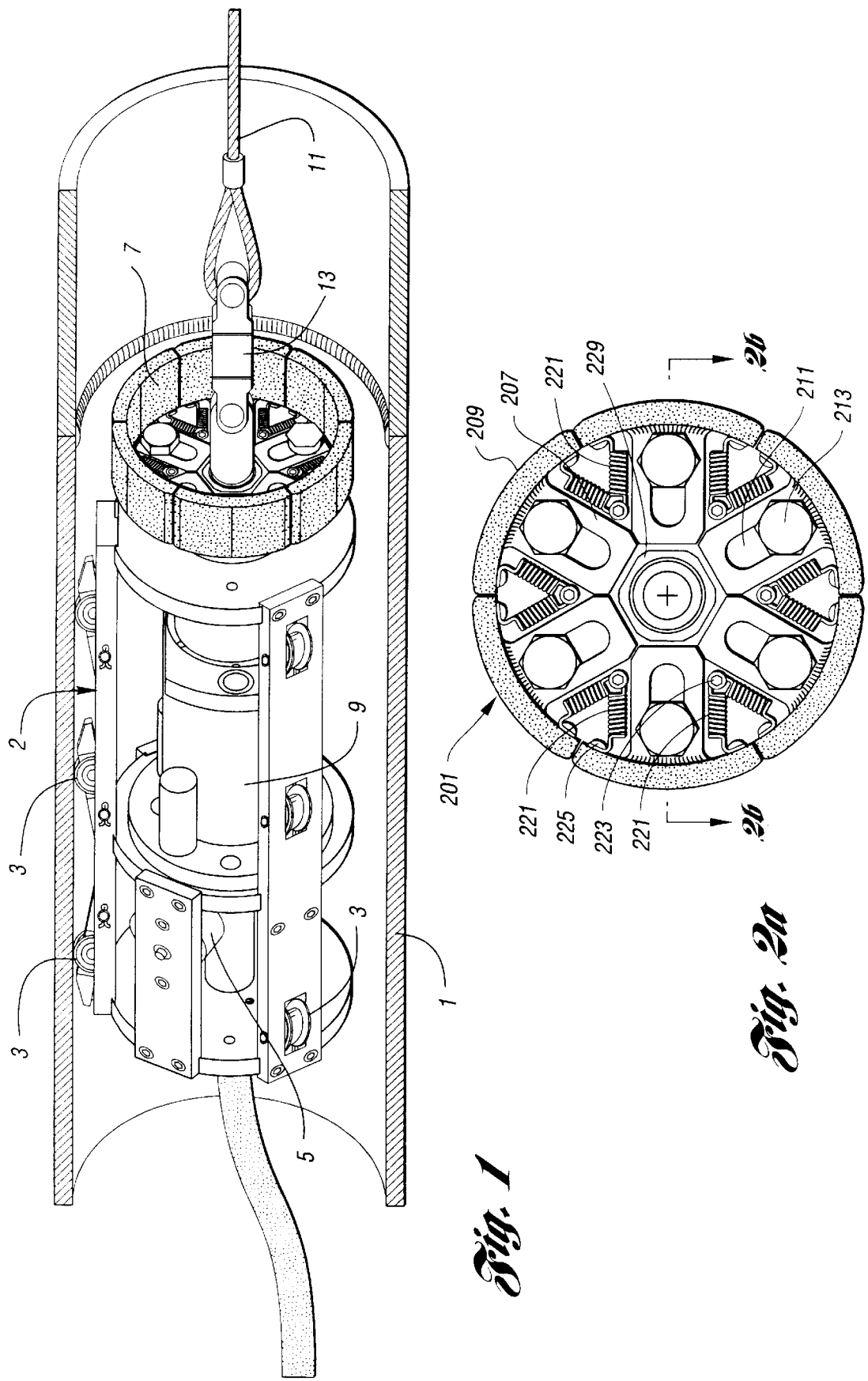

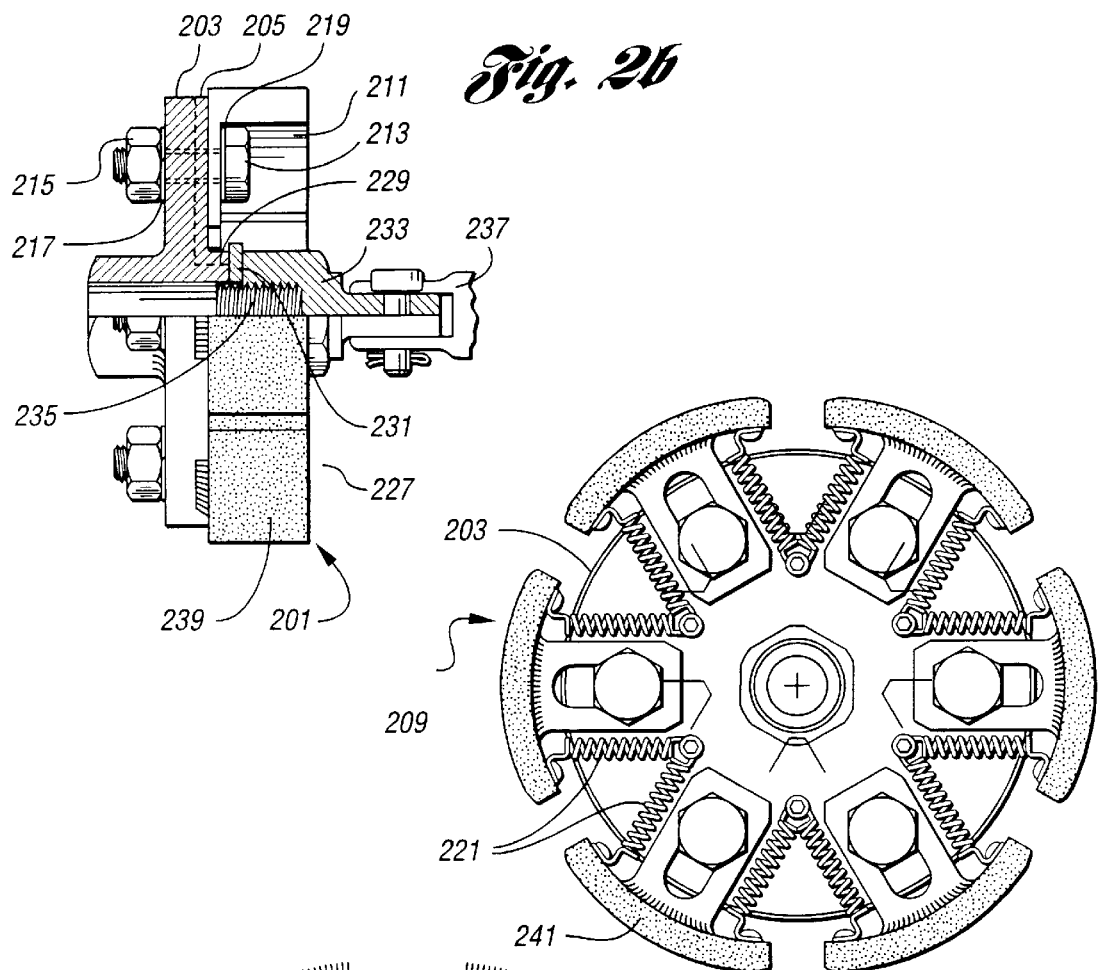
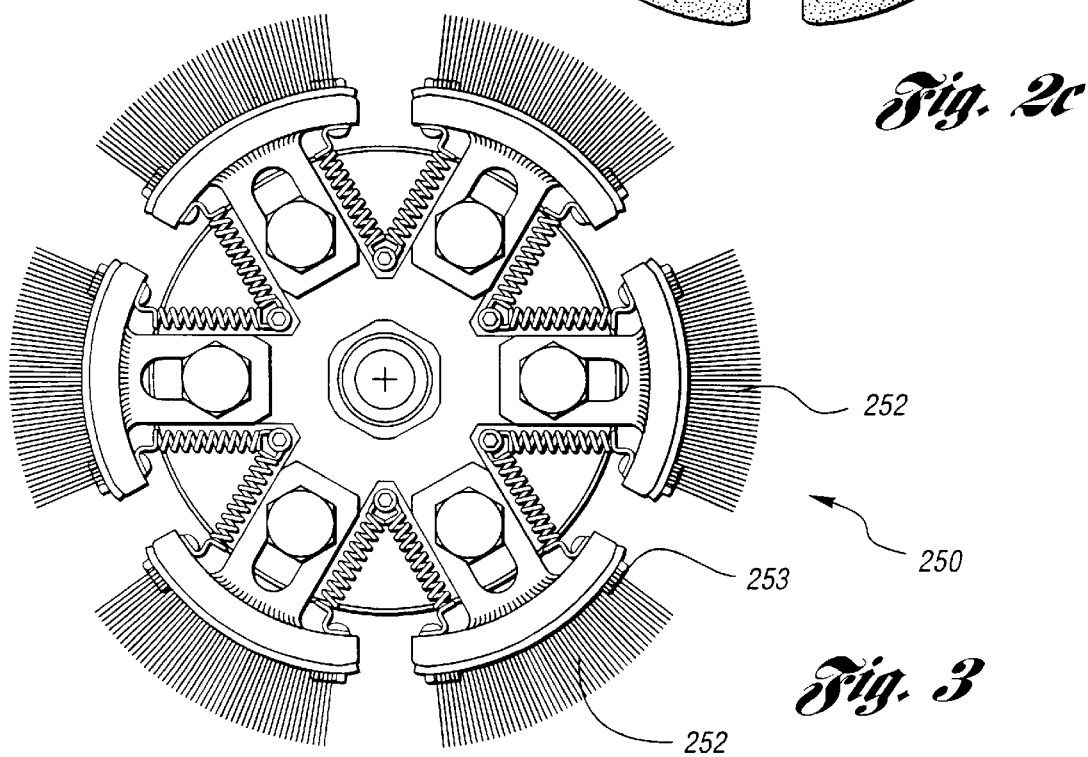

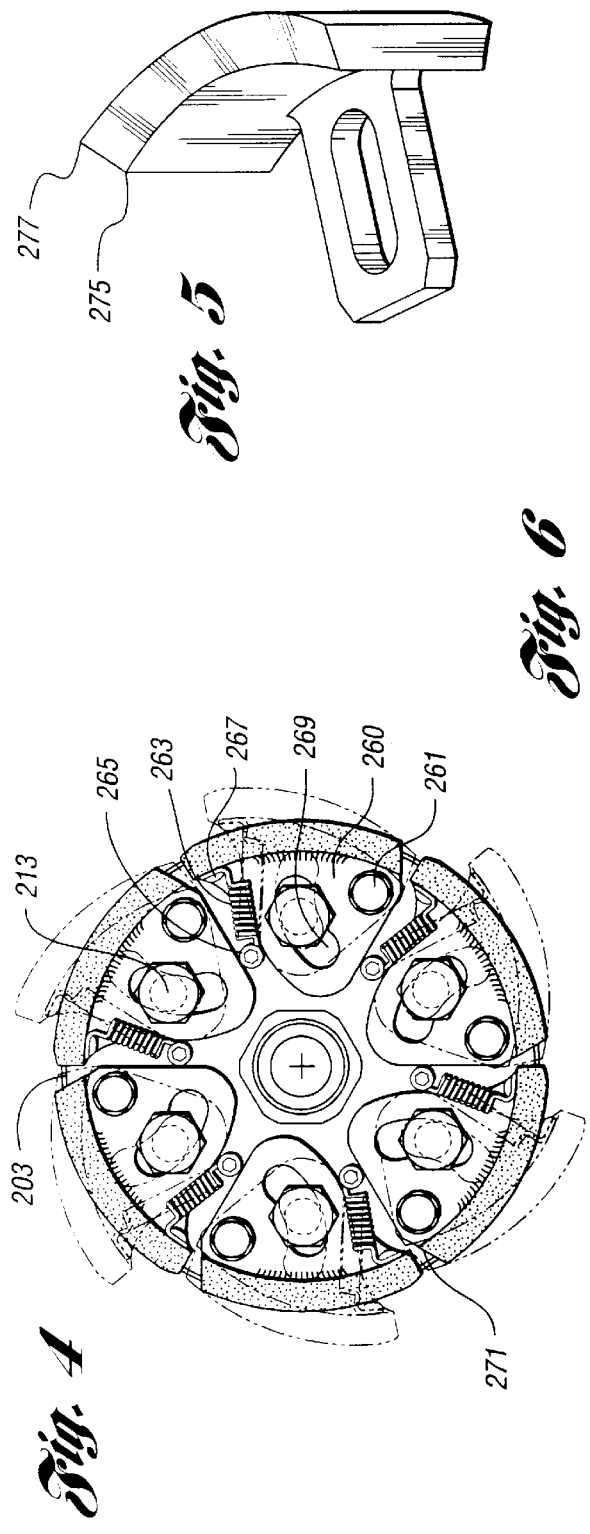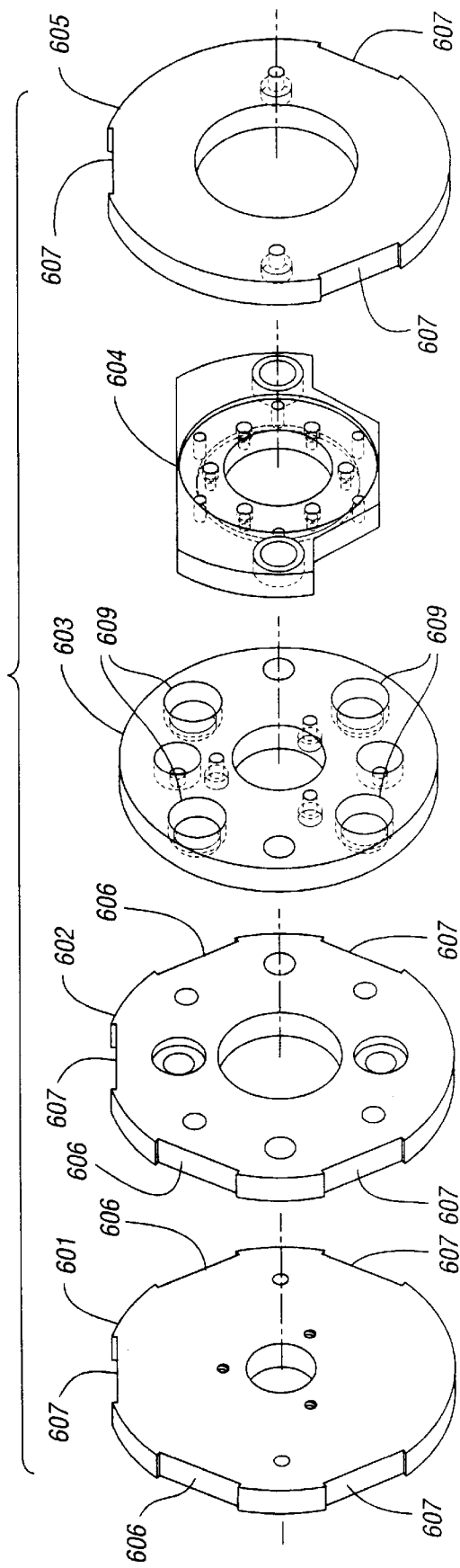

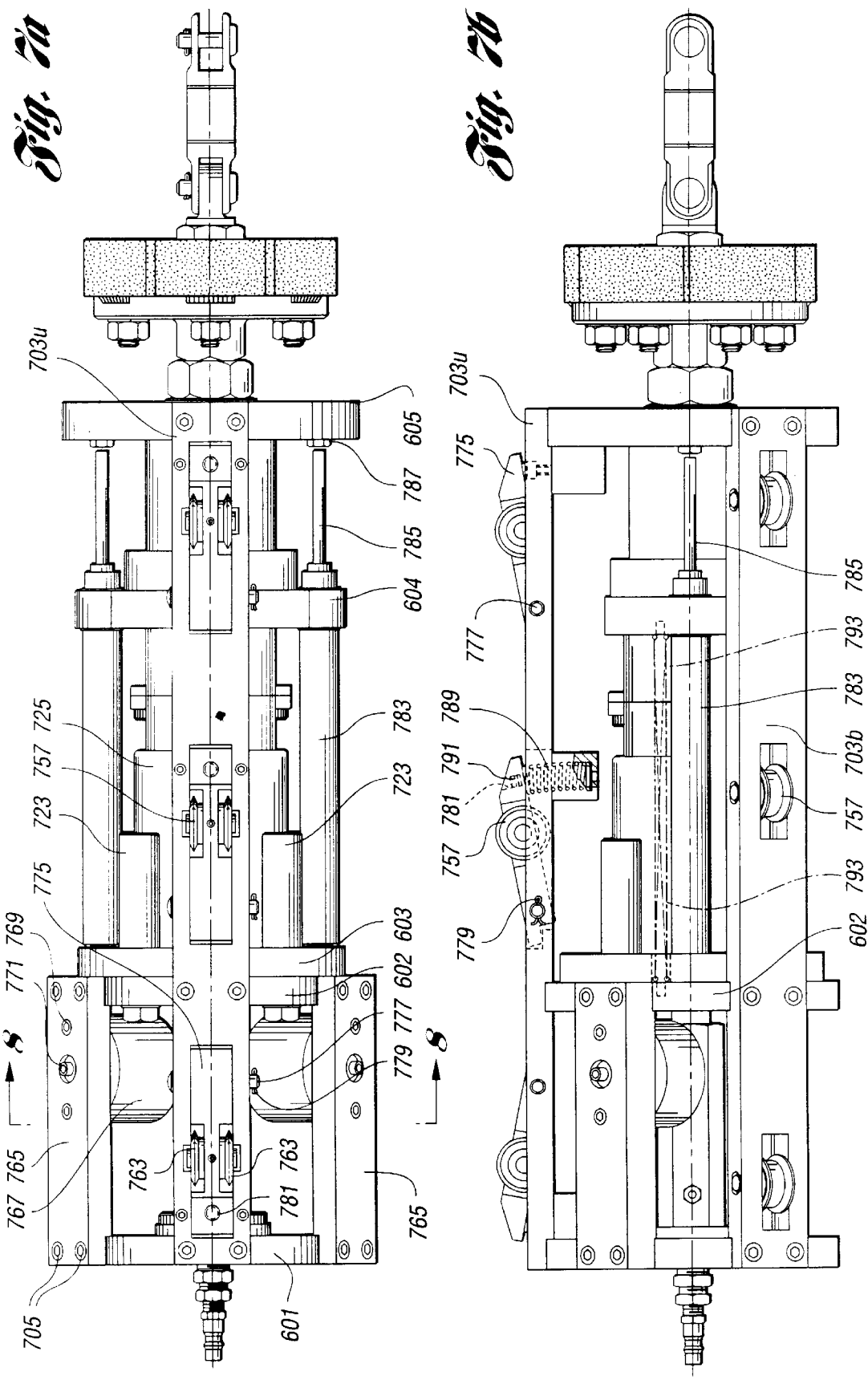

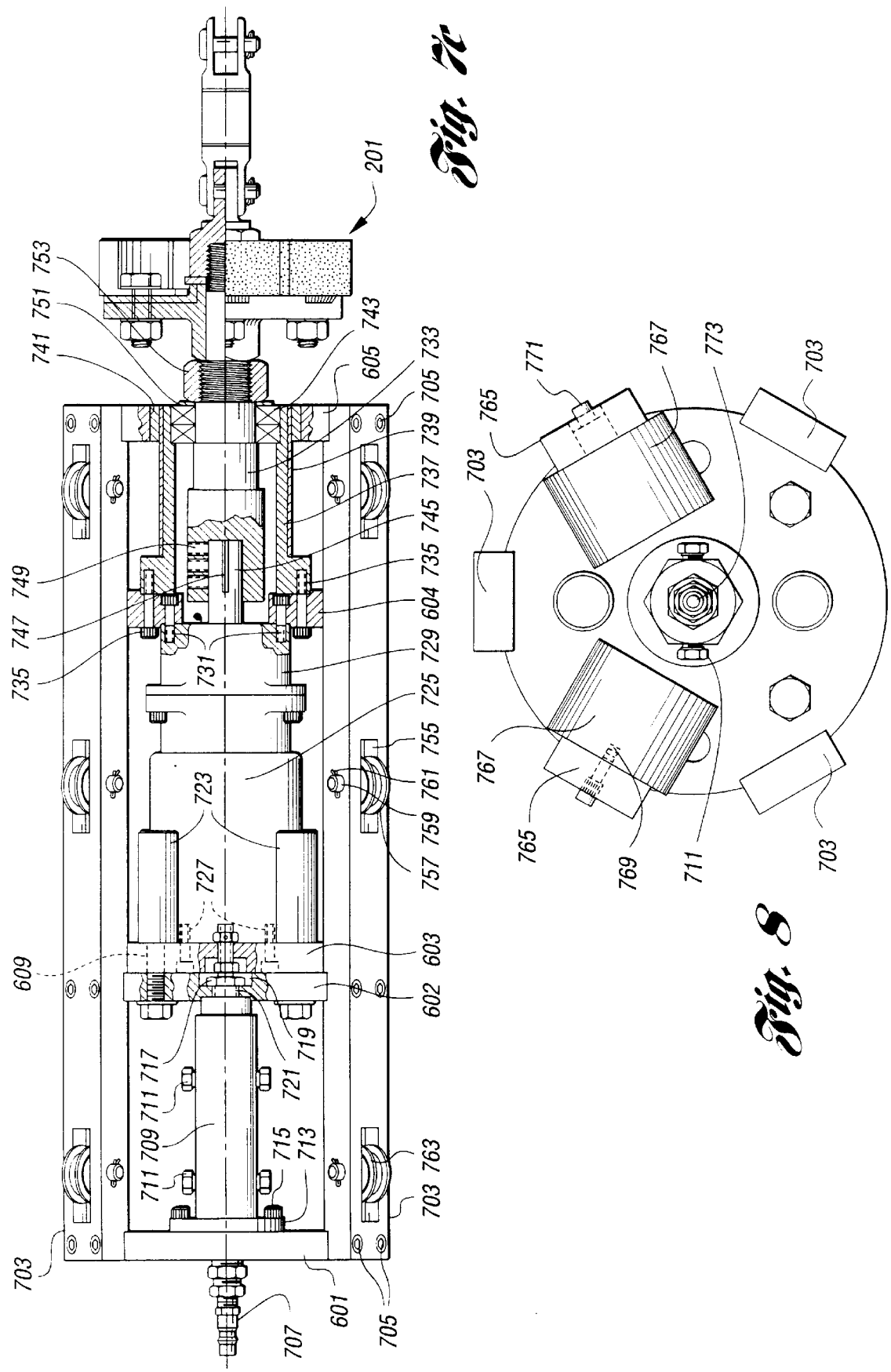

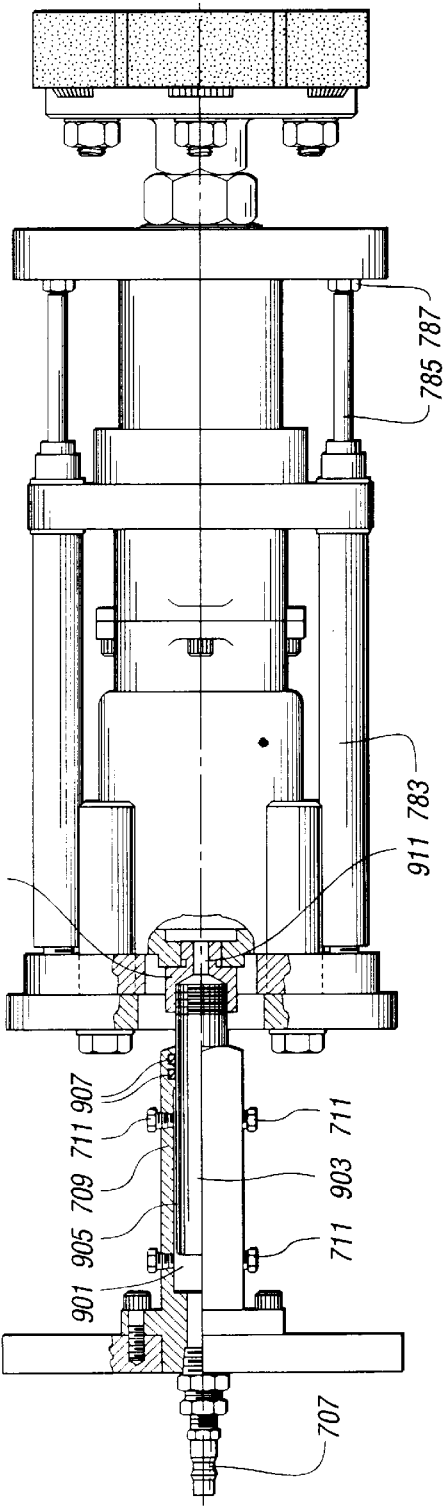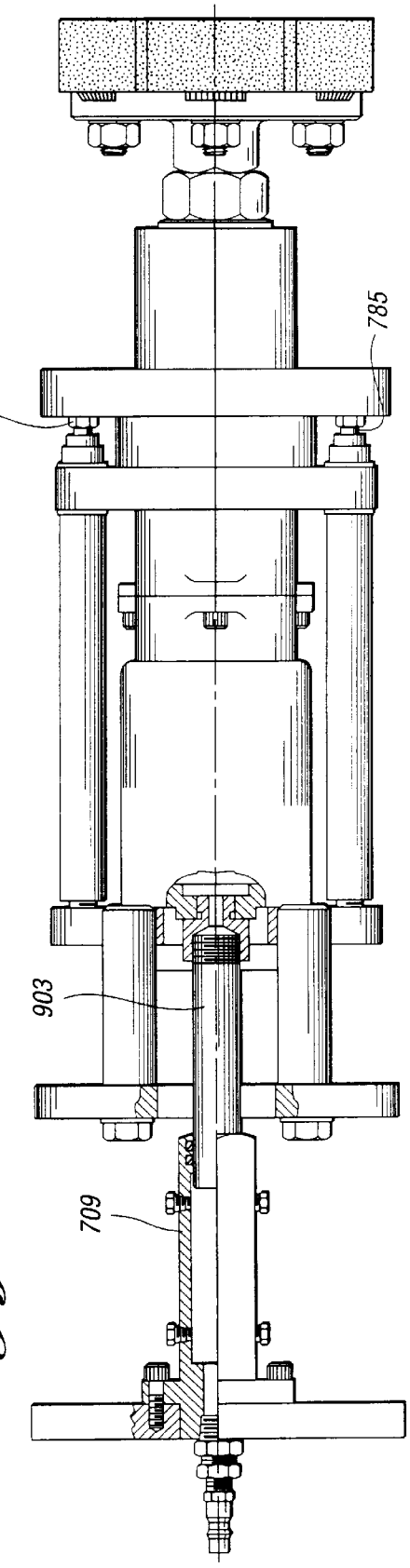

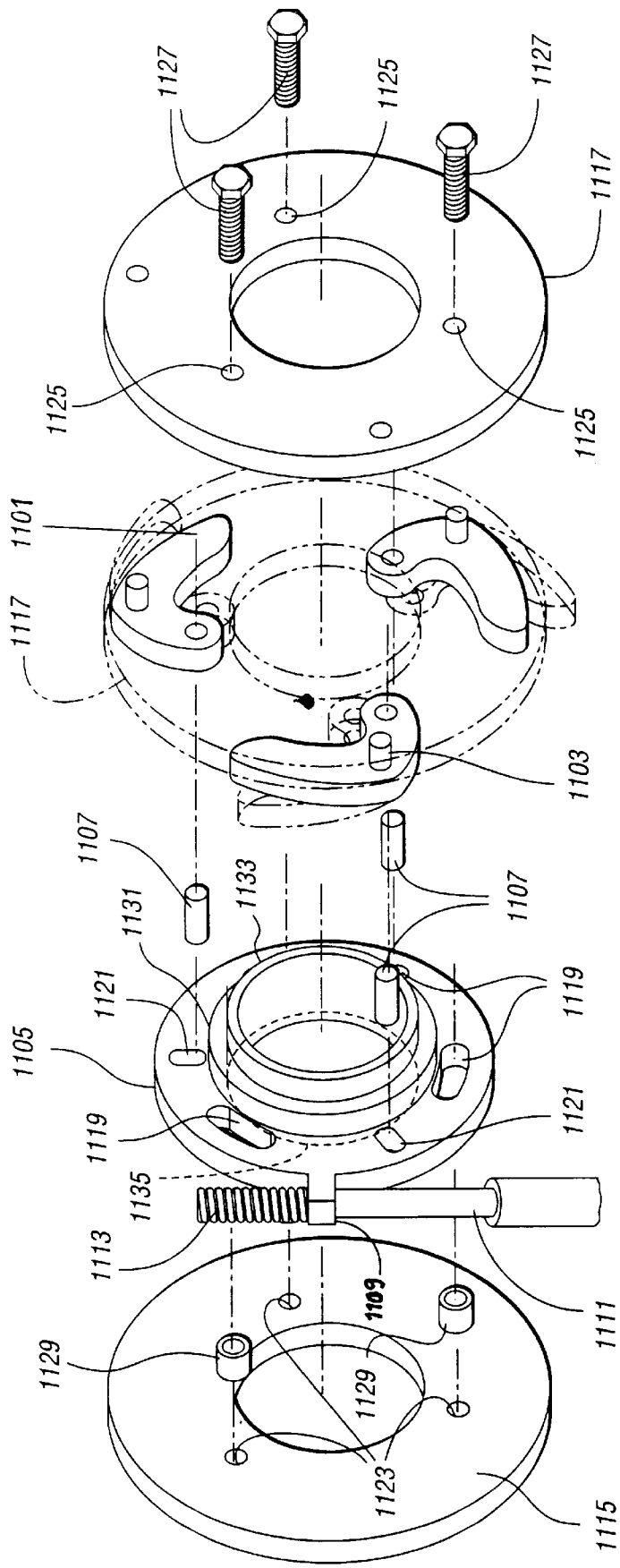

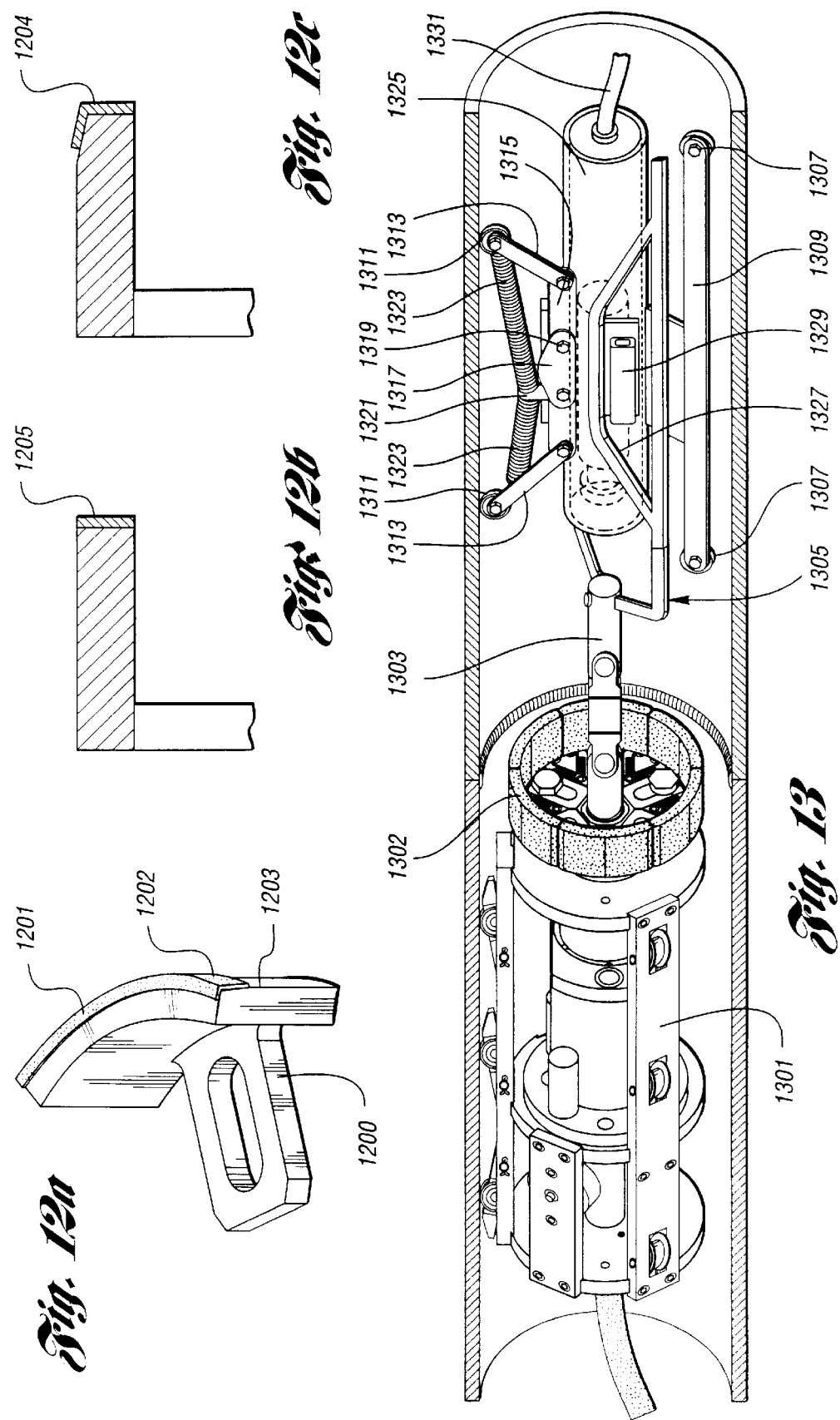

MULTI-FUNCTION PIPELINE WELD REMOVAL APPARATUS

TECHNICAL FIELD

The present invention pertains to pipeline maintenance and renovation. More particularly, the present invention pertains to a multi-function apparatus suitable for removing protruding welds and other obstructions in pipelines, for example those suitable for gas transmission.

BACKGROUND ART

Gas transmission pipelines are widely used to distribute natural gas from producing gas fields to local pipeline taps, from thence across the country to local distribution stations, and from there to power utilities or individual consumers. The flow rates and pressures in such pipelines may vary over a wide range. To transport the enormous quantities of gas required, the diameter of gas mains may often reach several feet in diameter. The pipelines are generally constructed of carbon steel, as this material is relatively inexpensive, strong, and joints can be fabricated easily, for example by butt welding.

The lifetime of gas and other steel pipelines is limited, however, due to both external and internal corrosion and other factors. Moreover, there are many occasions where prior connections must be sealed off, or pipeline damage caused by earth movement, construction mishaps, and the like, must be corrected. In many such pipe relining has proven to be an acceptable repair method, avoiding wholesale replacement of the pipeline or pipeline section. In cure-in-place pipeline relining, a sleeve of fiber reinforced, curable polymer is inserted along the relevant length of pipe, expanded against the pipe walls, and cured, producing a fiber-reinforced polymer composite inner lining. In slip relining, a prefabricated lining is pulled and/or pushed through the pipeline.

In order to reline a pipeline successfully, the pipeline must be cleared of debris and cleaned, and any protrusions removed. Protrusions such as service connections and plugs, etc., may be removed by robotic precision cutting and grinding tools. Steel, cast, and malleable iron nipples as large as 4 inch diameter may be removed with tolerances acceptable for relining operations. Milling cutters or "core bits" cannot be used for such removal operations because the milling cutters or bits are necessarily of a smaller diameter than the pipeline, and thus a small stub is left behind. This stub must generally be ground away. Precision grinders of the type useful in pipelines are expensive and slow in operation. The time which a pipeline is removed from service is generally critical, as customers may be without gas during this period.

Welds are more problematic. Whereas taps and plugs are generally small and restricted to a small area, allowing a precision grinding machine to be remotely positioned at the required position, welds generally occur over the entire inner circumference of the pipeline. Moreover, as most pipeline welding operations are of necessity done in the field with the pipe substantially horizontal, the amount of weld protruding from the top of the pipe may not be the same as that protruding from the sides or bottom. For example, in the relining of the Union Turnpike (Queens, N.Y.) gas main, excess welds ⅜ thick and ¾" deep covering 50% of the pipe circumference was encountered in a 10" diameter main. To complicate matters further, the weld metal may be considerably harder than the relatively soft materials of plugs and nipples, and may be irregular as well. Robotic precision grinding tools are ill-suited for use in removing weld. For example, precision grinding tools are capable of removing excess weld as described above at the rate of about 3 to 6 joints per eight hour shift. While this rate is intolerably slow, acceptable alternatives have not existed heretofore.

In U.S. Pat. No. 4,460,920 is disclosed an articulatable, stepping manipulator useful in straight and curved pipes both horizontal and vertical, for rewelding, grinding and other operations, particularly for nuclear power plants. In the '920 device, two counterstepping bodies each have a plurality of clamping bodies to bear against the pipe. With the clamps on one body released, pneumatic or hydraulic pistons extend or retract that body from the first. Upon clamping of the moved body against the pipe walls, the other body may be unclamped and follow the first, in "inch worm" fashion. A single grinding wheel is positioned on a bearing such that the plane of the grinding wheel forms an acute approach angle tangent to the tube wall at the contact point of the grinding wheel.

The device of '920 requires an electrically driven grinding wheel, generally prohibited in much underground work, and grinds only a small portion of protruding weld at a given time. Moreover, as the grinding wheel wears, the unit must be removed, and/or the grinding wheel repositioned or replaced, otherwise the angle of attack may vary considerably. For the same reason, the '920 device can be used effectively only for a single pipe size.

In U.S. Pat. No. 5,233,791 is disclosed a tool body similar to a reamer which cuts and/or grinds the interior of a pipe. However, such a tool is of necessity somewhat smaller than the pipe bore and thus cannot grind welds, nipples, etc., flush but instead must leave a slight protrusion. The driving mechanism and construction are not suitable for use in long pipelines where runs of several hundred feet may occur without machine access. U.S. Pat. No. 5,175,964 discloses an apparatus for similar service, but on which is mounted an angularly disposed grinding wheel similar to that of the '920 patent. Like the '791 patent, the '964 device is designed for use in remedying defects in relatively short lengths of non-welded pipe, i.e. oil field drill pipe and casing prior to installation, and is not suited to long runs of pipe.

U.S. Pat. No. 4,084,484 appears to disclose a welding flash removal tool used to remove weld flash immediately following resistance butt welding. The device employs rotating cutters cantilevered from a rod and mounted to a movable appliance. In use, the cutters are urged outward against the pipe by spring pressure against a hydraulic piston. The amount of working fluid within the retaining side of the piston is lowered at each revolution by the opening of a slide valve bearing against a fixed cam. Thus, the rate of feed is constant from cut to cut along the length of the pipe, although for any given cut, the feed rate varies inversely with the distance from the center of the pipe with its invariant cutting rate, the amount of time spent in grinding a minor amount of flash is the same as for heavy flash. Moreover, the device is quite complex mechanically with numerous sliding and rotating hydraulic valves which require complex sealing arrangements. Cantilevering from a boom is also problematic, particularly in pipes of narrow cross-section. A working member cantilevered to a boom is also illustrated for use in sewer tubes (generally nonmetallic) in U.S. Pat. No. 5,207,031.

U.S. Pat. No. 5,054,976 discloses an inside processing apparatus stated as useful for grinding and cleaning operations inside pipes. The apparatus consists of a single grinding wheel mounted off-center to the pipeline axis and driven by two sets of planetary gears such that rotation of the respective gear sets can position the grinding wheel at different positions around the inner circumference of the pipe. The apparatus requires numerous precision machined parts, and is capable of grinding completely through a pipeline if not monitored carefully. The device is particularly suitable for non-metallic sewer pipe relining operations where grooves to contain sealing rings are to be machined. Replaceable heads can be attached to facilitate grinding, cleaning, cutting tree roots, and the like.

None of the devices of the related art are suited for the rapid removal of weld from metal pipelines. It would be desirable to provide an apparatus suitable for the removal of welds from the inside of pipelines which is capable of high throughput. It would be further desirable to provide an apparatus which is robust yet simple construction, and adaptable to numerous pipeline diameters. It would yet be further desirable to provide an apparatus which not only has the capability of rapid weld removal but further can be used to cut off nipples, plugs and other protrusions as well as being useful for cleaning, descaling, and other operations associated with pipeline refurbishing and/or relining, or similar operations in other tubular structures.

SUMMARY OF THE INVENTION

It has now been surprisingly discovered that the above objects and other desirable objects can be accomplished through the use of the multi-functional weld removal apparatus as described herein. In its simplest form, the apparatus comprises a robust carriage adapted to be pulled, pushed, or driven through a pipeline or other tubular structure, and a replaceable centrifugal expanding grinding/polishing head. The device in its simplest form is capable of being energized by a single pneumatic hose line. A carriage carrying a video camera is preferably attached to the weld removal apparatus through a revolving swivel.

BRIEF DESCRIPTION OF THE DRAWINGS

FIG. 1 illustrates a perspective view of one embodiment of the subject apparatus within a pipeline;

FIG. 2a illustrates one view of one embodiment of a centrifugally expandable grinding device;

FIG. 2b illustrates a side view of the embodiment of the grinding device of FIG. 2a across 2b—2b;

FIG. 2c illustrates the expandable grinding device of FIGS. 2a and 2b in an expanded condition;

FIG. 3 illustrates a view of one embodiment of an expandable wire brush device;

FIG. 4 illustrates a further embodiment of a centrifugally expandable grinding device;

FIG. 5 illustrates one embodiment of a grinding shoe suitable for use in the grinding devices of FIGS. 2a–2c having a protruding lip for plunge cutting;

FIG. 6 illustrates one embodiment of the spaced arrangements of flanges suitable for constructing one embodiment of a carriage according to the subject invention;

FIG. 7a illustrates a top view of one embodiment of a multi-function pipeline weld removal apparatus;

FIG. 7b illustrates a side view of one embodiment of a multi-function pipeline weld removal apparatus;

FIG. 7c illustrates a bottom view of one embodiment of a multi-function pipeline weld removal apparatus;

FIG. 8 is a forward-looking view taken across 8—8 of FIG. 7a;

FIG. 9a is a view of a multi-function pipeline weld apparatus in the "rest position," the carriage rails, clamp rails, and clamps omitted for clarity;

FIG. 9b is a view of a multi-function pipeline weld apparatus in the "extended plunge position," the carriage rails, clamp rails, and clamps omitted for clarity;

FIG. 11 illustrates a combination clamping device and centering device suitable for use in the subject apparatus;

FIGS. 12a–c illustrate additional embodiments of grinding shoes suitable for use with the present invention; and FIG. 13 illustrates a video carriage attached to the main carriage through a swivel.

DETAILED DESCRIPTION OF THE PREFERRED EMBODIMENTS

Figure 10A:
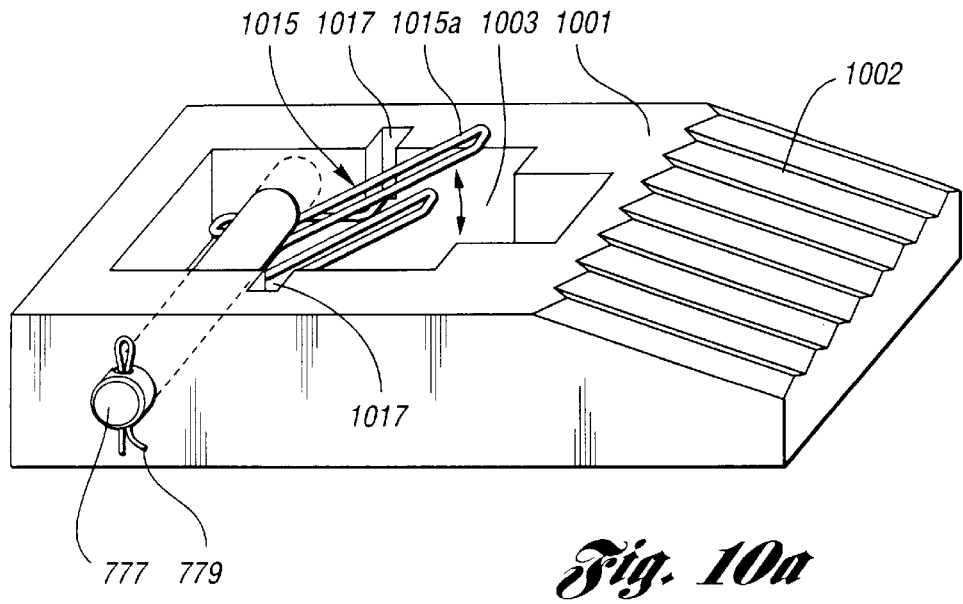
FIGS 10a–c illustrate a combination transport facilitating device and clamping device suitable for use in the subject apparatus.

As indicated previously, the subject invention multi-function apparatus in its simplest form comprises a carriage adapted to traverse the length of a pipeline or other tubular structure, and a grinding and/or polishing device which expands radially by centrifugal force to bear against the portion of the pipeline or tubular structure needing refurbishing. The carriage must be constructed such that it can be substantially centered in the pipeline or tube and fixed temporarily in position to receive the reactive force generated by the grinding wheel against the pipe or tube interior. For this purpose, a fluid actuated clamping device is used. Numerous preferred embodiments and improvements on the basic device constitute preferred aspects of the invention. Numerous modifications may also be made by those skilled in the art without departing from the spirit of the invention. While the description henceforth will refer to pipelines per se, it is understood that the description also pertains to uses in other tubular structures including various processing towers, gun barrels, and the like.

One embodiment of the subject apparatus, in simplified form, is shown in FIG. 1. The apparatus is located within a pipeline 1 in need of refurbishing. The apparatus comprises a carriage 2, located around the perimeter of which are a plurality of wheels 3 which allow the carriage 2 to be easily pushed, pulled, or driven through the pipe. Pneumatically operated clamping devices 5 allow the carriage to be located in position. At the end of the carriage is a centrifugally expandable grinding/cutting wheel 7, driven by pneumatic motor 9. In the preferred embodiment, the apparatus is pulled through the pipeline by a cable 11 attached to swivel 13. Activating air is directed to the apparatus by pneumatic supply hose 15.

In operation, the apparatus is pulled through the pipeline to the desired location, i.e. where weld removal is required. The positioning may be aided through the use of a video camera or other sensing device mounted on the carriage, but preferably by a separately positionable video camera which preferably precedes the carriage through the pipeline. The video camera is drawn down the pipe by a cable and supplies its signal to an externally located monitor through coaxial cable. The use of video cameras to position pipeline implements and inspect pipeline interiors is known in the art and forms no part of the present invention.

When properly positioned in the pipeline, the pressurized air supply is activated and air jacks act outwardly to extend the clamping devices 5 against the interior wall of the pipe. At substantially the same time, the pneumatic motor begins rotating the grinding device 7 whose grinding shoes (refer to FIG. 2a–2c) begin to expand radially against their return spring pressure. At a revolutional speed determined by the weight of the grinding shoes and the strength of the springs, the grinding device will have expanded to the point where the grinding surfaces contact the protruding weld. The rotational speed is preferably in the range of 300 to 2000 revolutions per minute (rpm), more preferably about 1000 rpm. After the weld has been reduced in size appropriately, the air pressure is removed, the springs once again pull the grinding shoes back to their rest positions, the clamps retract, and the carriage may be advanced to a new position for grinding another weld.

In a preferred embodiment, the carriage is constructed such that a linear motor (pneumatic piston) advances the motor/grinding wheel assembly as air pressure is applied. In such cases, the grinding device is positioned short of the weld to be removed, the forward motion of the linear motor performing the final positioning. The benefit of such a means of operation is that the advancement of the grinding device allow the latter to be used in a plunge cutting role, either for weld removal for narrow but deep (highly protruding) or highly irregular welds, or for removing plugs and nipples and the like, which, with the subject apparatus and unlike core cutters, may be cut flush with the surface.

Having now described the general mode of operation of the apparatus, the individual components may be described with particularity. One of the great advantages of the subject invention apparatus in its preferred configuration is its robustness combined with flexibility and simplicity. However, it must be emphasized that the apparatus may be easily and relatively inexpensively modified to be capable of very fine levels of control without departing from the basic concepts disclosed herein.

The carriage will have a generally cylindrical aspect, preferably having a length which may be from about 2 to about 6 times its diameter. In cross-section, the device may be circular, polygonal, etc. The material of construction is not important so long as it has the strength, rigidity, and durability to result in a stable structure. Carbon steel is the preferred material of construction due to its strength, low cost, and easy machinability. However, other metals such as cast iron, stainless steel, aluminum, bronze, etc., may also be used. It is further possible to manufacture the carriage of carbon or glass fiber reinforced composite materials, e.g. carbon fiber reinforced epoxy resin, pultruded carbon fiber-reinforced polyphenylenesulfide, and the like. Short fiber reinforced nylon and other thermoplastics are also suitable, but much preferred is carbon steel, as indicated previously.

When constructed of metal materials, the carriage may be welded together by traditional welding methods, or may be assembled by conventional fasteners, i.e. bolts, capscrews, etc., the latter method of assembly being preferred. The carriage may advantageously constructed from a series of bulkheads or flanges with diameters of the same order as the diameter of the carriage and located transverse to the cylindrical axis of the carriage. While other equivalent constructions may suggest themselves and be within the spirit of the invention, the use of a series of flanges has advantages with respect to ease of machining, ease of assembly, ease of future modification and repair, and importantly, serve to provide suitable attachment points, etc., for the various linear motors, check valves, pneumatic motor, etc. It must be emphasized that the Figures used herein to further describe preferred embodiments shall not be taken as limiting in any way.

The carriage contains a plurality of transport facilitating and centering devices (TFCs) which allow the carriage to be pushed, pulled, or driven through a pipeline, and which at the same time assist in centering the carriage within the pipeline. In a preferred embodiment, the TFCs are carriage mounted wheels, and in a most preferred embodiment, the wheels are knife edge wheels, preferably dual knife edge wheels. The use of wheels as a TFC device enables the carriage to be pulled, pushed, or driven (transported) through the pipe with minimum effort. Use of dual knife edge wheels facilitates transport with minimal effort over scale, rust, debris, etc., while also providing limited resistance to rotation due to the narrow contact area and the "bite" of the knife edges onto the pipe surface.

However, while wheels are the preferred TFC device, it would not depart from the spirit of the invention to employ skids of metal or plastic for this function. Extending metal skids can perform much the same function as wheels with regard to centering the carriage within the pipeline, although transport energy will be much higher, and therefore the risk of snapping a cable, etc., is higher. Lubricous plastics such as high molecular weight polyethylenes and polypropylenes, nylons, aramids, polytetrafluoroethylene, polyvinylidene chloride and the like may be used as skids, lowering the transport energy requirements. However, due to the rough surface often encountered, such devices will require frequent replacement when used.

The positioning of the TFC devices around the perimeter of the carriage should be such so as to substantially center the carriage within the pipe, at least while cleaning, grinding, etc. operations are being performed. By "substantially center" is meant that the position of the carriage with respect to the pipeline axis is such so as to allow contact of the grinding, scale removal, polishing device (hereinafter, "tool") with substantially the entire inside circumference of the pipeline. In general, the cylindrical axis of the carriage and the cylindrical axis of the pipeline should not differ by more than about 20%, preferably 10% of the internal pipe diameter. Any difference between the axial positions should be capable of being accommodated by the allowable movement of the tool shoes in the centrifugal tool head.

The functions of the TFC may also be split into separate transport and centering functions. For example, a plurality of wheels and/or skids may be employed to perform the transport function, while one or more pneumatically operated centering device(s) performs the centering operation. In such cases, these devices together comprise a TFC device. The location of TFC devices and more particularly transport devices when transport and centering functions are performed separately, is not overly critical, but the locations should be arranged such that the device may be stably guided through the pipeline, preferably with a minimum of rotation, and preferably such that the carriage is spaced rather uniformly away from the pipeline along the length of the carriage in order to ensure that the tool is substantially perpendicular to the pipeline's inner periphery.

In a preferred embodiment, TFCs are located in a plurality of rows parallel with the cylindrical axis, preferably three or four rows. These arrangements lend themselves to ease of manufacture. For example, three rows of wheels may be positioned along the length of the carriage and at 120° angles from each other, a vertical plane parallel to the carriage or pipeline and passing through their respective cylindrical axes bisecting one of the angles of separation of the rows of wheels, leaving two sets of wheels evenly disposed on each side of the device and a third set vertically disposed, in the case of three sets of TFC devices. Reference may be had to the drawings in this respect.

However, as the carriage is substantially cylindrical in aspect, any geometric arrangement which allows for the positioning heretofore described is within the scope of the invention. For example, rather than three rows of TFCs, a plurality of circularly disposed TFCs may be used with none of the TFCs lying along the same axis parallel to the carriage axis.

The carriage should contain provisions for mounting the necessary devices associated with the operation of the apparatus of the subject invention. Such devices include linear motors, preferably in the form of pneumatic cylinders, capable of thrusting the tool forward; pneumatic clamping and/or centering devices acting substantially radially to the carriage axis, again generally comprising a pneumatic cylinder; hydraulic check valves; rate limiting valves; and the pneumatic motor which drives the tool head. The necessary devices may be secured to bulkheads or flanges, to side rails, or to brackets extending from any of these. The various pneumatic devices may be associated with limit switches to control the rate of extension or the rate of rotational acceleration, or to limit the final amount of extension or rotational speed While the device preferably is driven pneumatically, hydraulic means may also be used, although such driving means requires a return hose and thus is not preferred. Also, the driving motor for the tool may be replaced by an electric motor. However, this detracts from the simplicity of the device and requires a power cord. Additionally, there are drawback associated with the use of electrically driven apparatus in many applications.

The tool head is preferably replaceable, being keyed or otherwise conventionally secured to the motor shaft, allowing grinding tools to be replaced with new tools having more aggressive surfaces; by specialized cutters or plunge grinding tools; or by a variety of cleaning tools, including wire brushes, etc. Tool heads are shown in FIGS. 2a–c, FIG. 3, FIG. 4, FIG. 5 and FIGS. 12a–c.

In FIG. 2a and FIG. 2b, a cross-section across 2b—2b of FIG. 2a, the grinding tool 201 comprises a robust flange 203 having a plurality of radially extending keyways 205 adapted to slidingly receive the foot 207 of a grinding shoe 209. The foot 207 of grinding shoe 209 has an elongated recess 211 through which securing bolt 213 passes. Bolt 213, nut 215, and washer 217 are machined such as to allow a slight clearance 219 between the foot 207 and the head of bolt 213 such that the shoes 209 may slide outward in keyways 205 against the pressure of return springs 221 as centrifugal force overcomes the return spring force. Return springs 221 are secured to flange 203 and shoe 209 by fasteners 223 and 225.

Emerging from the flange 203 on the non-carriage side 227 of the device is a land 229 on which bears washer 231 against which bears swivel retaining nut 233, secured to threaded securing shaft 235. To swivel retaining nut 233 is attached swivel 237 which, in a preferred embodiment, is attached to a substantial cable to pull the apparatus through the pipeline. The central portion of swivel 237 (13 in FIG. 1) is conventionally located between the respective ends of the swivel so as to allow rotation of grinding device 7 (FIG. 1) without rotation of cable 11 (FIG. 1). The radial outside surface 239 of shoes 209 is covered with abrasive, e.g. aluminum oxide, carborundum, diamond, tungsten carbide, borazon, or the like. The abrasive may be directly applied to the shoes, or the abrasive may be applied to separate metal strips or cloth strips, etc., and these secured to the outside surface of the shoes by conventional methods, e.g. epoxy or thermoplastic adhesive, screw-type fasteners, etc.

In operation (see FIG. 2c), the rotation of the tool head generates an outward centrifugal force which acts against the force of return springs 221, extending the shoes 209 away from flange 203. The outside surfaces of the shoes contact the weld or protrusion to be removed, grinding it away. The greatest grinding pressure will be exerted against the most protruding portions of weld. Shoes which during rotation do not encounter weld bear against the pipe wall, but at the pressure generated have little effect unless the air pressure (and rotational speed) is increased inordinately. In a preferred embodiment, the lateral face (thrust face) 241 of the grinding shoes 209 is coated with abrasive so as to be able to perform a "plunge cut."

A wire wheel 250 is illustrated in FIG. 3, and may be constructed identically to grinding tool 201 except that rather than bearing an abrasive surface, to the outside faces 239 of the tool are mounted wire brushes 252, secured by retaining devices 253. Additional devices are shown in FIGS. 12a–c. FIG. 12a illustrates a shoe grinding tool 1200 having a portion of its leading edge 1201 and a ramped portion 1202 of its outer circumference abrasive-coated, while the remainder of the outer circumference 1203 is abrasive-free. A similar arrangement is shown in FIG. 12c except that the entire leading or "thrust" face 1204 is abrasively coated. FIG. 12b illustrates a tool where only the thrust surface 1205 is abrasively coated.

In FIG. 4 is an alternative style centrifugal grinding apparatus. Around flange 203 (as in FIGS. 2a–c) are located retaining bolts 213. However, instead of a keyway in which the shoes move outward radially, in FIG. 4, the shoes 260 pivot about a retaining pin which may be the shoulder of pivot bolt 261. The shoes are held in their retracted position by return spring 263 which is secured to flange 203 by securing bolt 265 and to the shoe by securing bolt 267. Elongated slot 269 is circular, with a radius dictated by the distance between pivot bolt 261 and retaining bolt 213. In operation, rotational centrifugal force overcoming return spring force forces the shoe to pivot outward around pivot pin 261, allowing the outer surface 271 of the shoe to contact the protruding weld. Other arrangements are, of course possible. The surfaces of the grinding shoes may be replaced by cutting surfaces, i.e. parallel sawtooth ridges of tungsten carbide or the like, and the leading faces of the shoes may be recessed so as to provide a leading, narrow cutting edge. A shoe such as the latter is shown in perspective in FIG. 5, where the outer portion of the leading edge of the shoe 277 protrudes beyond the inner portion 275, allowing an "undercut" plunge cut.

A carriage may now be particularly described with respect to FIGS. 6–9. FIG. 6 illustrates in exploded view a series of flanges utilized in a preferred embodiment of the subject invention. The flanges are shown without the attaching rails and clamping support bars Flanges 601, 602 and 605 are stationary, i.e. non-movable flanges, while flanges 603 and 604 are flanges which move as part of the forward feed unit of a preferred embodiment. Flanges 601, 602 and 605 each contain three radial recesses 607 along the flange peripheries to receive three carriage rails which, with flanges 601, 602, and 605, will form the basic, substantially cylindrical carriage. Flanges 601 and 602 further contain two additional radial recesses 606 which receive, in a preferred embodiment, the clamping bars. Movable flange 603 contains four guide bushing holes 609 to maintain parallelism during forward thrusting by bearing against guide pins 723 (see FIG. 7a). Although construction and machining complexity may increase, it is possible to eliminate recesses 607 and mount the circular flanges within a machined tube which would serve also as a mounting surface for the air clamp cylinders, TFCs, etc. It is also possible to mount carriage rails directly to circular flanges not containing recesses 607, with some loss in rigidity. Other arrangements and/or shapes, numbers of flanges, etc., are possible, as are of course welded up structures.

FIGS. 7a, 7b and 7c represent top, side, and bottom views, respectfully, of a carriage complete with transport devices, clamping devices, air motor, etc. Beginning with the bottom view 7c, flanges 601 through 605 are ordered as in FIG. 6, and are connected by identical carriage rails 703, two of which are shown. The carriage rails need not be identical. The carriage rails are located within the radial recesses 607 in flanges 601, 602 and 605, and secured thereto by securing devices 705, which may be machine bolts, cap screws, Allen screws, or the like.

At the left side of the drawing is the single pneumatic quick disconnect fitting 707 of a preferred embodiment, in this embodiment communicating with combination air distribution manifold/forward feed cylinder 709, which contains air distribution ports 711 for connection to the clamping cylinders and auxiliary devices. The non-moving cylindrical body of air distribution manifold/forward feed cylinder is fixed at one end to stationary flange 601 by means of flange 713 and bolts 715 and may be fixed at the other end to stationary flange 602 by retaining nut 717 located in recess 719 of flange 602, retaining nut 717 cooperating with threaded extension 721 of the air distribution manifold/forward feed cylinder.

Also attached to flange 602 are forward feed guide pins 723, these pins passing through holes 609 in flange 603 which are of a diameter so as to provide a sliding fit with guide pins 723. The further operation of the forward feed portion of the apparatus and the coaction of the various components will be described later, in FIGS. 9a and 9b. In a simplified device, flange 603, the forward feed guide pins, and associated structures are dispensed with, and the air distribution manifold/forward feed cylinder 709 replaced with a simple air distribution manifold or like device. In this case, construction is simplified greatly, however the forward feed feature is dispensed with. Preferably, forward feed capability is retained.

Continuing with FIG. 7c, at 725 is an air motor, such as those commercially available, bolted, in this embodiment, to movable flange 603 by bolts 727. The front power take-off portion 729 of the air motor is bolted to movable flange 604 by bolts 731. Attached to the other side of flange 604 is motor shaft extension 733, secured by bolts 735. Surrounding the motor shaft extension is a thrust bearing housing 737 preferably surrounded by a softer metal, i.e. brass or bronze sleeve 739 which slides within forward feed bushing 741 located in stationary flange 605. Within housing 737 are thrust bearings 743. The motor shaft extension 733 is secured to the air motor shaft 745 by conventional means, e.g. by key and keyway 747 and Allen screws 749. Retaining washer 751 and retaining thrust bearing nut 753 secures the thrust bearing/motor shaft extension assembly. The centrifugal grinding tool 201 has previously been described.

Along the support rails are a plurality of holes 755 containing wheels 757 which rotate about axles 759 secured within the holes in rail 703 by cotter pin 761. The wheels shown are of the double knife edge type, having dual knife edges 763. While three wheels are shown on each rail, two could easily be used as well, as could more. Moreover, the wheels may be mounted along the side of the rails, on brackets attached to the rails, or upon mounting structures other than the rails. Preferably, the holes 755 are of a sufficient size to accommodate wheels of various sizes. In this manner, the same carriage may be useful for a variety of pipe sizes, i.e. a carriage suitable for a 9 inch (23 cm) diameter pipe may be used for pipes of larger diameter, i.e. up to 14" (35.6 cm) diameter or more, by changing to larger wheels. In less preferred embodiments, the wheels may be replaced by metal or polymeric skids, as previously indicated. Wheels other than dual knife edge wheels may be used as well.

Referring now to FIG. 7a, a view of an embodiment of the subject apparatus is shown from the top. Stationary flanges 601, 602, and 605 can be readily seen, as can forward feed guide pins 723 which surround air motor 725. In the top view, clamping rails 765 are located by the fourth and fifth recesses 606 (FIG. 6) of stationary flanges 601 and 602, secured thereto by securing fasteners 705 as was the case with the attachment of the carriage rails to the flanges. Mounted onto clamping rails 765 by securing fasteners 769 are air jacks 767, which, when activated by pneumatic pressure, cause carriage clamps 771 to extend outward against the pipeline interior, locking the carriage in place. In FIG. 8, section 8—8 of Figure 7a is shown. The air jacks 767, clamp 771, and securing fixture 769 can be clearly seen against the background of stationary flange 602. Also shown is the clamp rail 765 and the position of air distribution manifold/forward feed cylinder 709, air ports 711, and the air supply passage 773 (refer to FIGS. 9a and 9b) which provides air to the air motor.

The TFCs of the upper rail 703u comprise wheels mounted on spring-loaded pivots 775. The preferred dual knife edges 763 of wheels 757 are clearly shown. The pivots 775 pivot about a pivot pin 777 secured in rail 703u by a cotter pin 779 or like device. The pivot contains a through hole or recess 781 to receive or cooperate with a spring (see FIG. 7b).

At 783 is a hydraulic check, mounted at its non-movable end to movable flange 603 and extending through movable flange 604. The rod 785 of the hydraulic check valve bears against adjustable fixed stop 787. The hydraulic check valves are not required in simplified embodiments not requiring forward extension. The hydraulic check valves are adjustable and vary the rate of extension of the forward thrust from about 0 inch/sec (0 cm/sec) i.e. no forward thrust, to 3 inch/sec (7.6 cm/sec), although more rapid rates are possible.

Referring now to side view 7b, the wheels 757 located in the bottom carriage rail 703b are clearly shown, as are the pivots 775 containing the topmost wheels 757 mounted on upper rail 793u. Pivot pin 777 and cotter 779 are visible, as is also the tensioning spring 789 with an extension 791 cooperating with hole or recess 781 to urge the pivot and wheel outward from the carriage. Also shown is return spring 793 which was omitted for clarity from the remaining views. The ends of spring 793 proceed through movable flange 603 and are attached by standard means to stationary flange 602 at one end and to movable flange 604 at the other. The return spring forces the thrust forward movable flanges to return to their retracted position upon removal of air pressure. For devices without forward thrusting capability, or where return air cylinders are utilized in the place of a return spring, the return springs are unnecessary.

In FIGS. 9a and 9b are shown the interior air paths and operation of the forward thrusting unit, without the rails, etc., for purposes of clarity. FIG. 9a represents the retracted (non-thrust forward) position. As can be seen from the Figures, air flowing into the quick disconnect 707 enters the interior 901 of air distribution manifold/forward feed cylinder 709, enclosing piston 903 which preferably has a clearance 905 between its outer surface and the interior cylinder wall. The clearance allows air to be distributed to ports 711. The piston is sealed within the cylinder by double O-rings 907. The interior of piston 903 contains a passageway to allow air flow through the piston to the air motor, the passageway extending through coupling 909 as 911 In alternative embodiments, the forward thrusting cylinder may be entirely separate and the air feed to the motor may be through ports 711 or from a separate air distribution manifold. Note that the rods 785 of hydraulic checks 783 are fully extended in the retracted position.

FIG. 9b illustrates the carriage of FIG. 9a in the thrust forward position. Note the rods 785 of the hydraulic checks are fully within their respective cylinders and bearing against stop 787. Note that piston 903 is extended outward from cylinder 709. Not shown in the Figures is a shut-off valve which disconnects the air jacks from the carriage when the valve is in the closed position.

In operation, the carriage is rolled to the position where a weld or other protrusion is to be removed. In the case of the preferred embodiment, the carriage is positioned (by viewing with remote video) at a position short of that desired such that upon thrusting forward, the grinding shoes will be located at the desired position. Upon application of air pressure, the air jacks 767 immediately deploy, forcing clamps 771 against the wall of the pipe, locking the carriage into position. The air pressure then moves the forward thrusting piston forward, causing movable flanges 603 and 604 with the air motor attached, to advance at a rate determined by hydraulic check 783. As the motor/movable flange assembly thrusts forward, the air motor begins rotation, the rotational speed of which continues to increase until the centrifugal force generated begins to overcome the return spring force of the tool head. As rotational speed further increases, the shoes begin expanding, and ultimately contact the weld.

By toggling the air pressure on/off, the rotating tool head may be made to momentarily retract from the thrust forward position and then thrust forward once more. By adjusting the forward thrust unit to a low rate of advancement, the shoes may contact the inner pipe periphery and be advanced forward into a weld, nipple, etc., cutting forward rather than outward.

The apparatus has been described with a robust, cost-effective and simple construction in mind. However, many refinements in the manner of operation are possible. For example, while the means of clamping has been described with reference to two clamping cylinders, numerous equivalent devices may be utilized. For example, it is possible to utilize but one clamp rather than two, the single clamp preferably mounted to the top rail, the clamp when extended thus bearing upon the top inside periphery of the pipeline.

Figure 10B:
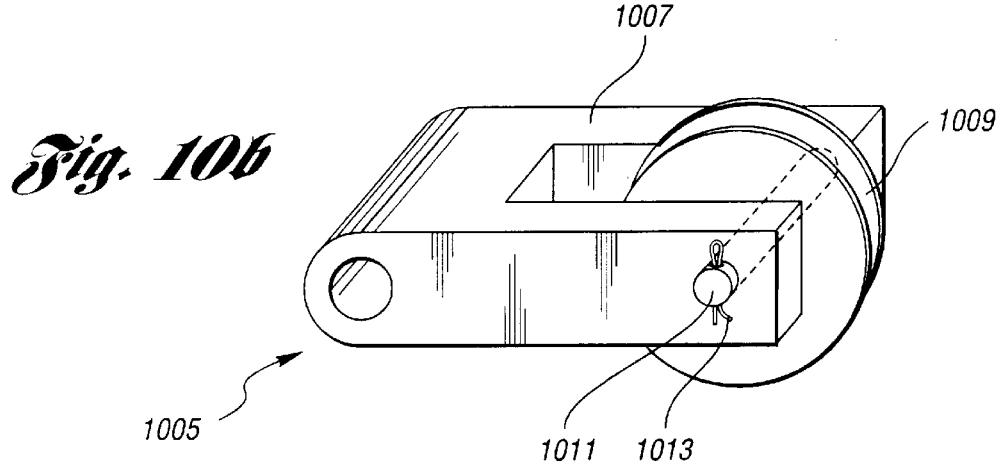
Figure 10C:
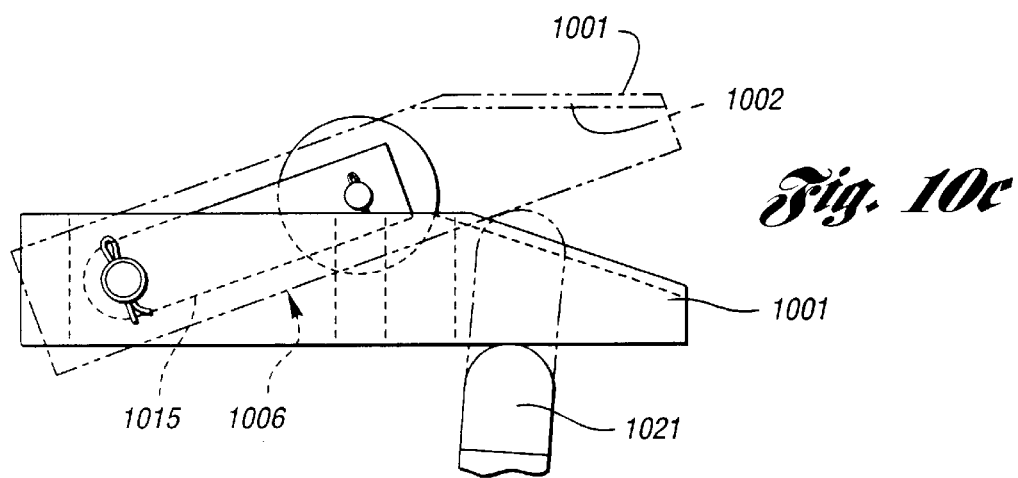

In a further embodiment, the clamps and transport devices in one or more positions, preferably replacing the one or more of the pivoting wheels in the top row of wheels, are replaced by combination centering and transport devices as shown in FIGS. 10a–c.

FIGS. 10, 10b, and 10c illustrate a dual pivoting structure suitable for combining transport and clamping operations. The pivoting structure 1001 contains a recess 1003 which will accommodate pivot/wheel assembly 1005 which consists of spring-loaded secondary pivot 1007 and wheel 1009, the latter rotating about axle 1011 secured by cotter pin 1013. Secondary pivot 1007 and pivoting structure 1001 both pivot about a common pivot pin 777 (see FIG. 7a) secured by cotter pin 779. Spring 1015 has its outermost ends located by recesses 1017, the end 1015a of the spring exerting an upward force on the bottom of secondary pivot 1007, pushing it and its associated wheel outward from the carriage such that the wheel bears against the pipeline wall. The wheel, being spring-loaded, serves to help center the carriage just as do the spring-loaded wheels located in upper rail 703u in FIG. 7a.

However, when it is desired to clamp the carriage in position, a pneumatic piston or similar device may be made to bear against the lower surface of pivoting structure as shown in FIG. 10c. The extending piston 1021 forces the pivot 1001 against the pipe wall, where the serrated leading portion 1002 contacts and grips the wall surface. Upon release of the pneumatic clamping force, the spring 1015 causes the pivot 1001 to retract to its normal position, the wheel 1009 once again contacting the wall. Many equivalent spring devices may be used in place of spring 1015, including bent strip springs, coil springs, torsion springs, and the like.

In the preferred embodiment, the transport devices, i.e. wheels, also provide the centering function. It is not necessary that the device be perfectly centered. Moreover, some provision must be made to take into account variations in the thickness of pipe walls, dents, deformation, eccentricities, etc. For this reasons, a carriage cannot, in general, be made with all transport devices fixedly mounted to bear against the pipe. If this were done, the device, upon encountering a deformed section, would become lodged and unable to move. Thus, at least one of the transport devices or series of devices must be made movable to provide for these contingencies. In the preferred embodiment, the lower wheels keep the carriage centered with respect to the pipeline axis plus or minus a small fraction of the pipeline diameter, for example ±0.25 inch (0.6 cm) in a 10 inch (25 cm) pipeline. In well laid and maintained pipelines, this tolerance may be made even smaller. Despite any difference in the carriage axis from the pipeline axis, a smooth grinding operation is maintained due to the grinding shoes being capable of movement in a radial direction, either outward by centrifugal force, or inward, assisted by the return spring. Thus, complete centering is not necessary, and even out of round pipes may be ground effectively. The same is not the case when conventional grinding wheels are linked to purely mechanical linkages.

However, the centering may be even more remote from that described above, i.e. more than 20% of the pipeline diameter away from the pipeline axis if pneumatically operated centering devices are used. Such devices may be combined with the clamping means and perform both functions, particularly in the case of weld removal. Design of suitable combination clamping and centering devices is within the skill of the art. For example, an iris type of centering device may be made by incorporating the device of FIG. 11, preferably trapped between two flanges having mounted thereon pneumatic centering/clamping cylinders. Three centering clamping cams 1101 are fixedly attached to an adjacent flange or flanges by bolt or pin 1103, and attached to rotatable activating ring 1105 by fasteners 1107. Upon clockwise rotation of the activating ring, the three cams are forced equally out away from the cylindrical axis of the device as shown in dotted lines. As the first cam strikes the pipe wall, the carriage will be pushed away until all three cams bear against the pipe wall, centering the device. Three cams are used as they may fit equally within the three carriage rails. More or fewer cams may be used as well, however for precise centering a minimum of three cams should be used. Rotation of the activating ring may be made by pneumatic cylinders fastened to an adjacent flange whose cylinders act against protruding bearing surface 1109, by an air motor with worm gear acting against a suitable toothed exterior of activating ring 1105, or other means which will be apparent to the skilled artisan.

Leftmost flange 1115 and rightmost flange 1117 are bolted together by bolts 1127 which go through bolt holes 1123 and 1125 respectively, and through spacers 1129 which are just slightly longer than the thickness of activating ring 1105. The bolts pass through elongated slots 1119 in ring 1105 to allow rotation of the latter. Ring 1105 is centered (coaxial) with respect to flanges 1115 and 1117 by means of locating shoulder 1133 adapted to enter the central hole in flange 1117, and locating shoulder 1135, adapted to enter the central hole in flange 1115. Return spring 1113 facilitates return to a non-expanded condition from extension by piston 1111.

The multi-function weld removal apparatus may be constructed with numerous improvements to facilitate weld removal in minimal time. For example, the device may be equipped with electrically activatable pneumatic valves, limit switches, etc., to finely regulate performance. Electrically operated pneumatic valves and the like may be actuated by energy supplied by a standard 12v or 24v battery, for example, with electrical signals provided by an umbilical cord providing low voltage actuating signals, or by a radio controlled receiver, eliminating the need for any electrical connection. Through use of such remotely activated valves, etc., the rate of thrust of the forward feed unit may be adjusted as may the air pressure and volume delivered to the motor. Clamps may be activated or rendered inactive without removing the apparatus from the pipeline and physically turning the air supply to the clamping cylinders on or off. The electric controllers and receivers are standard items readily available or easily manufactured.

Following weld removal, it is often necessary to further clean the entire relevant pipeline interior surface. Such cleaning operations can be conducted with a wire brush assembly such as that depicted in FIG. 3 rather than the grinders of FIGS. 2a–2c, FIG. 4, or like devices. Through the use of the subject apparatus, it is possible to remove welds of long sections of pipe and clean/polish the pipe interior during a morning shift, and reline the pipe during an afternoon shift. Through use of the subject apparatus, weld removal is far faster than prior methods, lowering the cost per weld removed significantly, and most importantly, reducing out-of-service time of the pipeline. For long runs of pipe where sufficient access exists, a double-headed device having a leading grinding device and a trailing cleaning/polishing head is capable of even higher throughput.

A preferred embodiment of the subject invention is shown in FIG. 13, where the pipeline grinding tool carriage 1301 is connected via rotating swivel 1303 to video carriage 1305. Carriage 1305 has two fixed sets of knife edge wheels, one set of two wheels 1307 being shown at 1309. The other fixed set of wheels is hidden from view. Spring loaded wheels 1311 are articulatedly mounted via arms 1313 to member 1315 which is secured to carriage 1305 by plate 1317 and bolts 1319, plate 1317 also securing spring post 1321 which serves as an attachment for tension springs 1323, which provide a tensioning force which directs wheels 1311 against the pipe interior. In a central protective tube 1325 is located video camera or equivalent device 1327, with light 1329 providing illumination. More than one light may be used as may other lighting arrangements including lens-mounted beam splitters. Coaxial cable 1331 conducts the video signal to an external monitor. Alternatively, a small transmitter may conduct the signal to an appropriate receiver.

Surprisingly, the combination of knife-edge fixed wheels and spring loaded wheels has been found sufficient to prevent rotation of the camera carriage during grinding, despite the fact that the grinding head 1302 is rotating at a high rate of speed. The rotating swivel serves to isolate the tool rotation from the video carriage. The image transmitted shows surprisingly little vibration as well.

While the camera carriage has been described as a relatively simple and cost effective device which may be readily welded together and constructed largely of flat stock, other configurations, all mounted to the driven tool head by swivel or equivalent rotational-isolation means (low friction fluid coupling, etc.), may be readily envisioned. For example, a simplified version of the pipeline grinding carriage 1301, retaining its basic shape, wheel and centering (locking) devices such as wheels 757 (FIG. 7b) and pneumatic centering/locking cylinders 767 (FIG. 7a) being retained, but other portions, i.e. grinding or polishing tool, pneumatic motor forward thrusting cylinders, limit switches, and the like eliminated. Thus, as illustrated in FIG. 6, flanges 601, 602 and 605, with their carriage rail receiving slots 607 may be retained, with pneumatic cylinders mounted between flanges 601 and 602 as shown in FIGS. 7a and 7b and wheels mounted in carriage rails 703, 703b, and 703u as shown in FIGS. 7a–c. The pneumatic cylinders may receive air through a hollow passage in the rotating swivel or through an additional air hose paralleling the video cable. Of course, if one or more of the wheels or sets of wheels are spring loaded, then the pneumatic cylinders may be dispensed with entirely.

While the present device has been illustrated in connection with refurbishing pipelines, it may also be used in other tubular and/or cylindrical structures. Examples of the latter are large gun barrels, i.e. naval cannon or howitzers to polish the barrel interiors; distillation columns in chemical processing plants where removal of accumulated deposits, etc., is desired; water pipes where removal of mineral scale is desired to restore the flow rate; electrical conduits where protrusions are desired to be removed, and the like. These examples are illustrative and not limiting. The term "pipeline" in the claims should be construed as including other tubular structures as well, and not limited to just pipelines unless indicated to the contrary.

Having now fully described the invention, it will be apparent to one of ordinary skill in the art that many changes and modifications can be made thereto without departing from the spirit or scope of the invention as set forth herein.

What is claimed is:

1. A multi-functional renovation apparatus suitable for performing renovation inside a pipeline of a nominal diameter D, said apparatus comprising:

a) a substantially cylindrical carriage having a maximum dimension transverse to its cylindrical axis less than D;

b) a plurality of transport facilitating and centering devices positioned such that at least upon application of power to said carriage the cylindrical axis of said carriage and the cylindrical axis of said pipeline substantially coincide;

c) at least one activatable clamping device which when activated exerts sufficient force between the interior surface of said pipeline and said carriage to substantially prevent rotation of said carriage about its cylindrical axis;

d) at least one power driven centrifugal tool head comprising a plurality of radially extendable shoes, an outer radial surface of said shoes defining a substantially circular shape having a diameter less than D, the center of said substantially circular shape substantially coinciding with the cylindrical axis of said pipeline when said cylindrical axis of said carriage and said cylindrical axis of said pipeline substantially coincide, said radially extendable shoes held to said diameter less than D by a spring force capable of being overcome by centrifugal force at a predetermined rotational speed such that upon rotation faster than said predetermined rotational speed, said shoes expand radially to an extended diameter equal to or greater than D such that an outer surface of said shoes or a tool affixed to said outer surface contacts the interior wall of said pipeline.

2. The apparatus of claim 1 wherein said plurality of transport facilitating and centering devices comprise a plurality of wheels arrayed circumferentially around said apparatus, the position and diameter of at least a portion of said plurality of wheels such as to substantially center said apparatus in said pipeline.

3. The apparatus of claim 1 wherein said power driven centrifugal tool head is driven by a fluid power motor.

4. The apparatus of claim 3 wherein said fluid power motor is an air motor.

5. The apparatus of claim 1 further comprising a forward thrusting mechanism which acts to extend said centrifugal tool head forward in a direction parallel to the cylindrical axis of said carriage.

6. The apparatus of claim 1, comprising:
a carriage constructed of:
   a plurality of stationary bulkheads, said bulkheads having outer dimensions less than D, and arranged in planes perpendicular to the cylindrical axis of said carriage;
   a plurality of carriage rails fixedly attached to a plurality of said bulkheads, said bulkheads and said carriage rails together defining a substantially cylindrical carriage;
   a plurality of transport facilitating and centering devices selected from the group consisting of wheels, skids, and combinations thereof, a portion of said plurality of transport facilitating and centering devices mounted on said carriage so as to substantially center said carriage with respect to the cylindrical axis of said pipeline when said carriage is in a substantially horizontal position;
   one or more fluid power operated clamping devices mounted on said carriage such that upon application of fluid power said clamping devices extend outward from said carriage to the interior wall of said pipeline, clamping said carriage in position with respect to said pipeline so as to resist a rotational force applied to said carriage;
   a fluid power motor, said fluid power motor coupled to at least one power driven centrifugal tool head.

7. The apparatus of claim 6 wherein said bulkheads comprise flanges.

8. The apparatus of claim 7 wherein said flanges contain a plurality of recesses in a periphery of said flanges, said recesses adapted in size to receive a portion of a carriage rail.

9. The apparatus of claim 7 wherein said carriage further comprises a plurality of movable flanges, said movable flanges movable with respect to said stationary flanges in a direction parallel to the cylindrical axis of said carriage by means of a cooperating fluid power driven cylinder, said fluid power driven cylinder fixedly mounted to one of said stationary flanges and to one of said plurality of movable flanges, at least one of said movable flanges also having said fluid power motor mounted thereto.

10. The apparatus of claim 1 further comprising a swivel mounted to a front portion of said power driven centrifugal tool head.

11. The apparatus of claim 10 wherein a video carriage is connected to said apparatus by attaching said video carriage to a side of said swivel remote from said tool head.

12. The apparatus of claim 11 wherein said video carriage has a plurality of rotation-preventing transport facilitating devices.

13. A pipeline weld removal grinding apparatus having a carriage of length L and a power driven centrifugal tool mounted thereto, comprising:

a) first, second, and fifth stationary flanges, said flanges having a substantially planar aspect, each of said flanges having outer dimensions across said planar aspect so as to fit within a pipeline having a diameter D, said fifth flange having a power opening therethrough to receive the shaft of a fluid power driven motor;

b) a plurality of at least three carriage rails, said carriage rails fixedly mounted to said first, second and fifth stationary flanges such that the distance between the outer faces of said first and fifth flanges is substantially equal to L;

c) a third, or movable flange capable of movement in a direction parallel to the cylindrical axis of said carriage, said third, movable flange having a fluid power motor fixedly attached thereto such that a power shaft of said motor extends through said power opening in said fifth flange;

d) optionally, a fourth, movable flange, said fourth, movable flange fixedly attached to said fluid power motor;

e) two or more clamping rails, said clamping rails fixedly attached to said first and said second stationary flanges, each of said clamping rails having mounted thereto a fluid power cylinder having a piston or extension thereof movable outward from said carriage in response to application of fluid pressure such that said piston or extension thereof contacts the interior wall of said pipeline fixing said carriage with respect to said pipeline so as to resist a rotational force acting against said carriage;

f) a plurality of wheels mounted to said carriage rails such that the cylindrical axis of said carriage substantially coincides with the cylindrical axis of said pipeline;

g) a forward thrusting fluid power driven cylinder having a fixed portion and a movable portion movable in response to fluid pressure, one of said fixed portion or movable portion fixedly attached to a stationary flange, the other of said fixed portion or movable portion fixedly attached to a movable flange such that application of fluid pressure to said forward thrusting fluid power driven cylinder causes said movable flange(s) to move relative to said stationary flanges;

h) a centrifugal grinding head comprising a plurality of radially expandable shoes, said shoes restrained by spring force such that in a rest position, said grinding head has a maximum outer dimension less than D and such that upon rotation to a rotational speed greater than a predetermined rotational speed said shoes expand radially so as to contact the inner wall of said pipeline, said shoes having abrasive disposed on one or more of a forward facing thrust surface or a radial exterior surface.

14. The apparatus of claim 13 further comprising one or more hydraulic rate limiting check valves cooperating with at least one movable flange and at least one stationary flange such that the rate of movement of said movable flanges by said forward thrusting fluid power driven cylinder may be adjusted.

* * * * *